(12) United States Patent
Cancilla et al.

(10) Patent No.: US 7,350,159 B2
(45) Date of Patent: Mar. 25, 2008

(54) INTEGRATED DIAGNOSTIC SYSTEM

(75) Inventors: Jim J. Cancilla, San Jose, CA (US); Bill Duran, Santa Cruz, CA (US); Robert Hoevenaar, Mundelein (NL); Arnold Kop, Avenhorn (NL); Keith A. Kreft, Cupertino, CA (US); Tyrone J. Moritz, Morton Grove, IL (US); James M. Normile, Hayward, CA (US); Terry R. Ogilvie, San Jose, CA (US); Dale A. Trsar, Mt. Prospect, IL (US); Dennis G. Williamson, Jr., Manteca, CA (US); Ken Wang, Cupertino, CA (US); Robert P. Edwards, San Jose, CA (US); Carl T. Raff, Union City, CA (US)

(73) Assignee: Snap-On Incorporated, Kenosha, WI (US)

( * ) Notice: Subject to any disclaimer, the term of this patent is extended or adjusted under 35 U.S.C. 154(b) by 454 days.

(21) Appl. No.: 10/134,690

(22) Filed: Apr. 30, 2002

(65) Prior Publication Data

US 2003/0020759 A1 Jan. 30, 2003

Related U.S. Application Data

(60) Provisional application No. 60/354,204, filed on Feb. 6, 2002, provisional application No. 60/291,622, filed on May 18, 2001, provisional application No. 60/289,116, filed on May 8, 2001.

(51) Int. Cl.
*G06F 3/00* (2006.01)
*H04B 10/08* (2006.01)
*G06F 11/30* (2006.01)
*G06F 17/00* (2006.01)

(52) U.S. Cl. ............... 715/854; 715/821; 715/828; 715/841; 715/817

(58) Field of Classification Search ............... 715/856, 715/810, 883, 771, 970, 817, 821, 828, 841, 715/854, 853
See application file for complete search history.

(56) References Cited

U.S. PATENT DOCUMENTS 4,072,851 A 2/1978 Rose (Continued)

FOREIGN PATENT DOCUMENTS

WO 99/57630 11/1999

OTHER PUBLICATIONS

Microsoft® Windows, Copyright 1998 (Screenshots 1-11).*
Microsoft® Windows, Copyright 1998.*

*Primary Examiner*—Kieu D. Vu
*Assistant Examiner*—Ting Zhou
(74) *Attorney, Agent, or Firm*—McDermott Will & Emery LLP (57) ABSTRACT

An integrated diagnostic system includes interface connectors to connect to a plurality of instruments/instrument modules, including engine analyzers, gas analyzers, oscilloscopes, scanners, network connections, and/or other desired peripheral modules. These modules advantageously interface to the system through diverse parts, connections and with various protocols. The system may connect to a network, wired or wireless, for interfacing among processors and modules, and with an internet connection for interaction with remote resources including databases and expert systems.

14 Claims, 8 Drawing Sheets

U.S. PATENT DOCUMENTS

| | | | |
|---|---|---|---|
| 5,483,339 A | 1/1996 | Van Aken et al. | |
| 5,537,590 A | 7/1996 | Amado | |
| 5,630,079 A * | 5/1997 | McLaughlin | 715/734 |
| 5,673,401 A * | 9/1997 | Volk et al. | 725/139 |
| 5,710,899 A * | 1/1998 | Eick | 715/764 |
| 5,815,154 A * | 9/1998 | Hirschtick et al. | 715/853 |
| 5,825,353 A * | 10/1998 | Will | 345/184 |
| 6,126,608 A | 10/2000 | Kemme et al. | |
| 6,154,201 A * | 11/2000 | Levin et al. | 345/184 |
| 2002/0008718 A1 | 1/2002 | Obradovich | |
| 2002/0054146 A1* | 5/2002 | Fukumoto et al. | 345/810 |

\* cited by examiner

FIG. 6A (1) A setting in the software determines the direction of movement in the list.

FIG. 6C

INTEGRATED DIAGNOSTIC SYSTEM

RELATED APPLICATIONS

This application claims the benefit of the filing date of co-pending provisional applications 60/289,116 filed May 8, 2001; 60/291,622 filed May 18, 2001; 60/354,204 filed Feb. 6, 2002, all incorporated herein by reference in their entireties.

FIELD OF THE INVENTION

A system diagnostic tool and, more specifically, an integrated handheld diagnostic system.

BACKGROUND OF THE INVENTION

In order to conduct a diagnosis on a machine or system, numerous diagnostic tools and testers must be used. For example, when conducting a vehicle diagnosis, a gas analyzer may be used for analyzing gas generated by a vehicle to determine the operation status of the engine; a scanner for connecting to a vehicle computer for interfacing and receiving self-diagnostic codes; an engine analyzer to obtain engine operational status, oscilloscopes for observing signal waveforms generated by different vehicle components, such as an alternator and/or a battery; and a battery tester to determine the health/charge status of the battery.

Different vehicle models/makes may need different diagnostic tools and testers. Every time a vehicle diagnosis is to be performed on a different make/model, diagnostic tools/testers used in a previous test/diagnosis must be removed from the working space, and new diagnostic tools/testers corresponding to the new vehicle under test have to be brought in and installed. The removal and reinstallation of diagnostic tools/testers consume a lot of time, with reduced operation efficiency and productivity. In addition, numerous signal lines connecting between the diagnostic tools/testers and the vehicle create hazards and inconvenience.

Therefore, there is a need for a highly integrated diagnostic system that is portable, easy to carry and use, and highly flexible and expandable. There is also a need to implement a central hub for receiving signals from various signal sources and make the signals available for observation on a display. Another need exists for a modularized diagnostic system that is easy to accommodate different system makes/models.

SUMMARY OF THE INVENTION

An integrated diagnostic system includes interface connectors to connect to a plurality of instruments/instrument modules, including engine analyzers, gas analyzers, oscilloscopes, scanners, network connections, and/or other desired peripheral modules. These modules advantageously interface to the system through diverse parts, connections and with various protocols. The system may connect to a network, wired or wireless, for interfacing among processors and modules, and with an internet connection for interaction with remote resources including databases and expert systems.

In accord with one aspect, the integrated data processing system comprises a processor for processing data, a first control key for moving a user selection in a first direction on a display, a second control key for moving the user selection in a second direction on the display, a data storage device bearing instructions. The instructions are configured to cause the system upon execution of the instructions by the processor to display a plurality of function buttons on the display, wherein one of the function buttons represents a plurality of functions. Then, the system receives a first signal representing depression of the first control key moving the user selection to the function button that represents the plurality of functions. The system then receives a second signal representing depression of the second control key when the user selection being moved to the function button representing the plurality of functions. In response to each depression of the second control key, the system displays one of the plurality of functions at a time.

BRIEF DESCRIPTION OF THE DRAWINGS

The accompanying drawings, which are incorporated in and constitute a part of the specification, illustrate exemplary embodiments.

DESCRIPTION OF ILLUSTRATIVE EMBODIMENTS

System Overview

Figure 1:
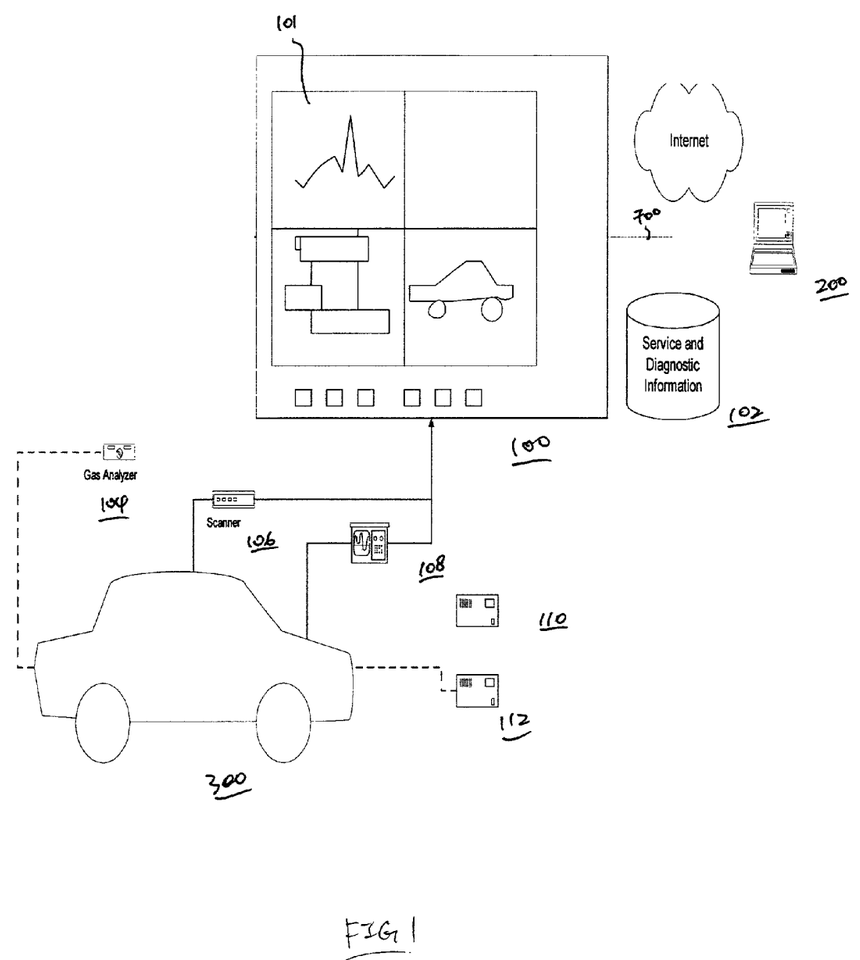
FIG. 1 is a system overview of the integrated diagnostic system.

FIG. 1 shows a system architecture upon which an exemplary embodiment is implemented. The embodiment uses an automotive service system for illustrative purpose only. Similar principles and obvious variations may apply to various types of systems, such as motorcycles, airplanes, powerboats, machines, equipment, etc.

Integrated diagnostic system 100 is a data processing system capable of processing data. The integrated diagnostic system may be a portable personal computer configured to operate with operating systems, such as Linux, Windows CE, or the like. The integrated diagnostic system 100 includes interface connectors for connecting to and communicating with numerous instruments/instrument modules, such as a gas analyzer module 104, a scanner module 106, an oscilloscope module 108 and other optional instrument modules 110, 112. The system has a display 101, such as an LCD display, and may optionally have a network interface for connecting to a remote computer 200 and/or a database 102 via a network connection 700. The network connection is either wire or wireless, or both. The integrated diagnostic system may connect to other data processing system via the network connection 700. The data processing systems may access data from the integrated diagnostic system.

Instrument Modularization

The integrated diagnostic system uses a modularized design for working with different instrument modules. The integrated diagnostic system may communicate with other stand-alone instrument via proper interface modules. The modularized design allows changing functionality by changing modules connected to the integrated diagnostic system.

Instrument modules are designed according to the requirements for its specific function, and each includes specific modularization requirements appropriate to that module. Proper software applications are needed to work with the instrument modules. Communication between the system and modules can be achieved by using existing communication standards, such as USB (Universal Serial Bus) connectors, serial ports, parallel ports, or the like. Proprietary interface protocols/sockets may be used if desired.

When developing in the Microsoft Windows environment, coding techniques, such as COM (Active-X) components and objects, may be used to create software applications. Applications themselves should expose an object model to allow other applications to treat them as servers.

When developing outside the Windows environment without the benefit of COM, similar environment specific facilities should be used to achieve modularization. API level function call interfaces should be exposed through shared libraries if possible. If shared libraries are not available link libraries should be used. If neither of these facilities is available, separate source files can be used to achieve a minimal level of modularity. Beneath these function call interfaces appropriate OS specific facilities should be used to accomplish the desired functions.

Client-Server Architecture

The integrated diagnostic system separates data providers (servers) from data consumers (clients). This modularization applies to both hardware and software components.

a. Client—Server Communication

The logical separation of functions between data servers and application clients is appropriate both within a single computer and when the server and client reside on different computers. When clients and servers both operate in a Windows environment the COM interfaces may be used for communication regardless of whether the server and client are on the same machine or connected via a TCP-IP network. These protocols will be implemented using TCP-IP networking when the devices are connected with Ethernet. Operating system specific transports may be used for communications between clients and servers within the same box.

Servers connected to the client via USB or proprietary networks are integrated by first incorporating the necessary OS drivers then building an appropriate user mode interface to the application through the vehicle communications system.

b. Instrument Servers

Instrument modules obtain information about a vehicle's condition by monitoring certain parameters obtained either by direct measurement or from controllers on the vehicle. If the integrated diagnostic system is connected to other data processing systems, the information may be accessible by those data processing systems in a normalized format. Therefore, each instrument module, combined with the integrated diagnostic system, serves as a data server providing requested data or information to other data processing systems. For example, a data server might supply streamed data at the rate provided by the vehicle, or include statistics such as min, max, and average value with an option to provide the buffered data upon a monitored or manual trigger event.

(1) Common Instrument Interfaces

Although vehicle measurements can be obtained from a variety of sources, all of these sources communicate with diagnostic applications using similar interfaces. Instrument/instrument modules coupled to the integrated diagnostic system communicate with their clients through a stream of data similar to a TCP socket connection or RS232 connection. A standard packet protocol provides a messaging interface on top of this connection.

Although different instruments/instrument modules with different capabilities may require some special messaging capabilities, a significant number of the functions are common between all instruments. These common functions should be invoked using standard interfaces. The application level protocols developed for integrated diagnostic system should be structured to support a standard set of messages for common functions and an additional set of messages that are specific to the device.

The architecture includes a standard mechanism for locating and identifying the vehicle data servers that may be available at runtime.

c. Application Specific Clients

A variety of clients will connect to the integrated diagnostic system in order to obtain data and perform specific tasks based on the data acquired to solve different problems according to the user's needs, such as fixing idle rough idle.

The Instrument Network

Figure 2:
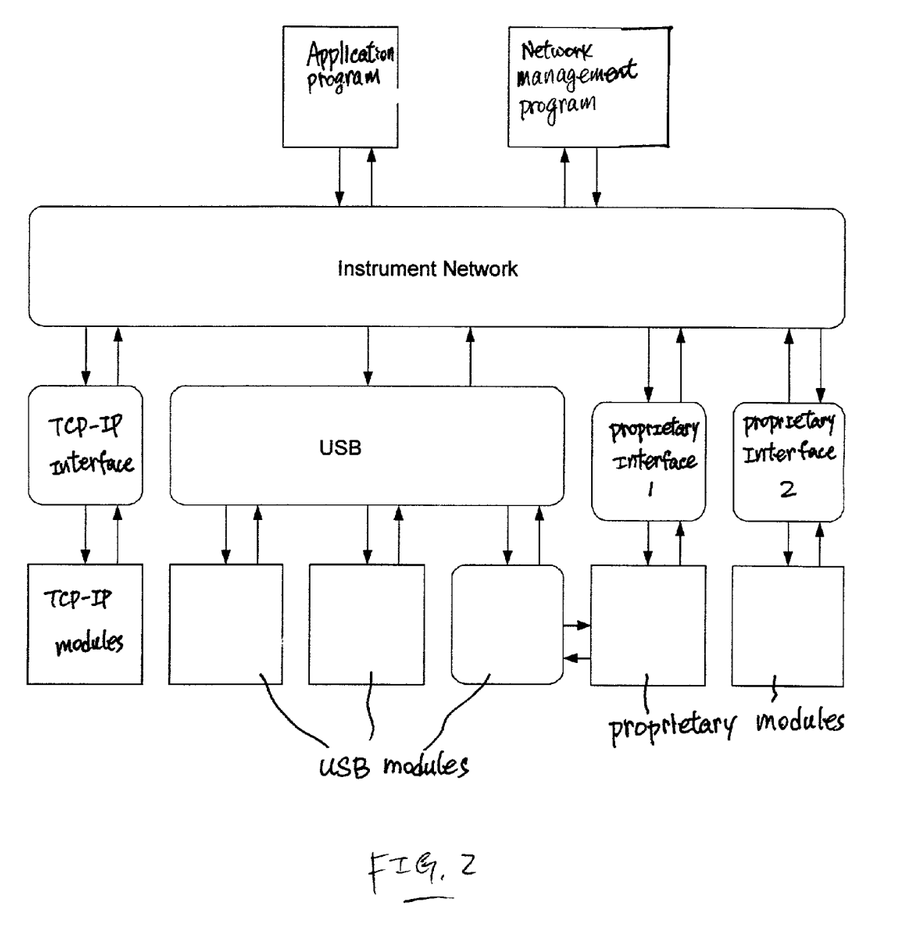
FIG. 2 shows exemplary connections between the instruments/instrument modules and the integrated diagnostic system using USB standard

The integrated diagnostic system obtains vehicle measurement data from a variety of devices such as the Scanner Module, Oscilloscope Module, Gas Analyzer Module, or Engine Analyzer module. The instrument modules may be connected to the integrated diagnostic system Display through Wireless, TCP-IP connections, USB connections, or through the proprietary Plug-in interface. FIG. 2 shows exemplary connections between the instruments/instrument modules and the integrated diagnostic system using USB standard.

Diagnostic processes and displays must be associated with specific measurement data obtained from the diagnostic instruments. The data elements and measurements made available through instruments are identified by a numeric id. Each instrument determines the specific meaning, format, and context of each id. Some instruments may require identification of specific vehicle characteristics before some or all data elements may be defined. Generally the combination of an instrument, vehicle, and data id is sufficient to determine all necessary information related to that data element such as type, format, units, etc.

a. The Instrument Network

Since numerous instruments/instrument modules may be connected to the integrated diagnostic system diagnostic unit through a variety of physical interfaces, the instruments/instrument modules form an instrument network connecting to the integrated diagnostic system.

A software application loaded during operation of the integrated diagnostic system determines what instruments/modules are available on the instrument network for use by a diagnostic application running on the integrated diagnostic system or a data processing system connected to the integrated diagnostic system. The software application reports the status of all modules connected to the integrated diagnostic system, and handles requests for data from a specific device connected to the network.

b. Instrument Identification

Since numerous of devices may be available on the instrument network, a process for identifying the available devices and selecting the appropriate device must be established, such as those adopted in the USB standards. Devices may be identified by a specific id or serial number, instrument type (scanner, oscilloscope, gas analyzer) or instrument module (scanner module or scanner smart cable).

c. Time Stamping

Since unpredictable time delays may be involved in data transmission, certain data packets will need to be time stamped by the instruments/instrument modules. This time stamp provides relative time information. Data sequence may be rearranged based on the time stamps. During connection establishment, and at other times as may be appropriate, the integrated diagnostic system and the instruments/instrument modules will synchronize their clocks to take into account network delays.

Figure 3:
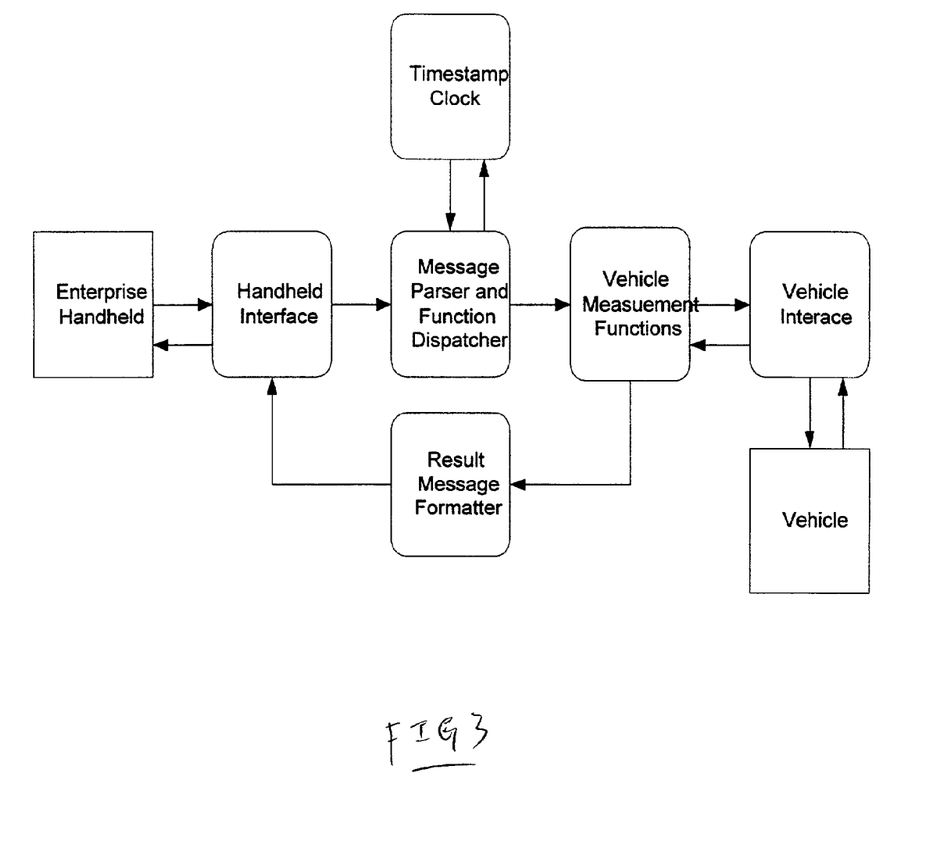
FIG. 3 shows a data flow during data acquisition from an instrument module.

FIG. 3 shows a data flow during data acquisition from an instrument module.

d. Instrument Network Gateway and Pass-Through

The integrated diagnostic system may embody some characteristics of a measurement device. Specifically the integrated diagnostic system may provide facilities through its communication interface to allow a data processing system connected to it to retrieve and display measurements from the vehicle through an instrument module, such as the Scanner Module. A data processing system, such as a PC, may connect to the integrated diagnostic system Unit through an RS232 cable or a network connection, or the like. The integrated diagnostic system will need to pass the data requests on to the scanner module and return the results back to the data processing system.

Rather than creating or adapting a new suite of protocols to address this requirement the Integrated diagnostic system display may provide for identifying itself as an instrument device with the capabilities of its contained modules and USB instruments that it is capable of reflecting. Requests to it can then be routed through its Instrument Network Manager and the results returned to the PC.

The Instruments/Instrument Modules

Although each instrument/instrument module connected to the integrated diagnostic system will be designed according to the requirements for the specific function they will perform, the instruments/instrument modules generally include the following components:

1. Interface to the Instrument Network
2. Message Parser and Function Dispatcher
3. Data Acquisition Functions
4. Data Buffering Functions sufficient to handled full duplex communication and continuous data gathering. Data over sampling, filtering, and glitch detection functions should be included as appropriate.
5. Data Normalization and Message Formatting Functions
6. Response Transmission Functions
7. Device Identification Functions
8. Clock Synchronization Functions
9. Device Maintenance Functions (Firmware Update)

The message parser receives a message from the instrument network and invokes the appropriate function based on the message content. After completing the requested action, the results and response data will be formatted and sent back to the client through the instrument network. When vehicle data is to be obtained, the instruments/instrument modules will interface with the vehicle to acquire the appropriate measurements. Once the measurements have been taken, the data are time stamped and sent as requested.

1. The Scanner Module

The Scanner Module provides access to diagnostic information and procedures available through a vehicle controller using a predetermined protocol, such as OBD II. The scanner supports a standard set of device identification, clock synchronization functions, and device maintenance functions.

2. Oscilloscope Module

The Oscilloscope Module has to conform to the general instrument architecture described above. The scanner module needs to support a standard set of device identification, clock synchronization functions, and device maintenance functions.

Exemplary Hardware Specification

The hardware of the integrated diagnostic system is a custom-built hand held computer featuring a Motorola PowerPC based CPU with supporting RAM, EPROM, and FLASH memory. User interface facilities include 640×480 VGA flat screen display, an embedded pointing device, Y/N buttons, and screen control buttons. A 10 base T Ethernet adapter, USB port, RS232 Port, Cardbus (PCMCIA) slot, and IRDA emitter/receiver are also included.

Exemplary Software Specification

The reliability of the integrated diagnostic system platform is enhanced through the use of CPU memory models that limit memory access between active processes. Software developed for environments such as this must maintain a clean separation between user or application mode program and system or protected mode code. Application logic executes in user mode where the effect of any anomalous behavior can be limited. Low-level hardware access must be performed within system code such as device drivers.

Communications between a diagnostic application and vehicle measurement instruments is based on standard QNX I/O streams. Once connection is established, a device stream is used for devices connected through proprietary module interface and for USB devices. A TCP stream is used for TCP-IP devices in order to ensure data integrity.

The Instrument Network Manager in the Integrated diagnostic system handheld provides a centralized repository for information about the instrument network. It builds and maintains a list of available devices so that applications may customize their operation based on the available data acquisition instruments. If also provides functions that will establish a connection to an available instrument of a specified class, product type, or product id.

Vehicle Identification

This interface is similar to selecting a vehicle from the list of recent vehicles, but instead of listing recent vehicles a list of open repair orders is obtained form the Shop Management server and presented to the user. When the user selects an open repair order, the vehicle information is obtained from the shop management severs and used to identify the vehicle to the diagnostic application. Any additional information necessary to identify the vehicle sufficiently to run a diagnostic procedure is obtained from the used and sent back to the shop management system where it is recorded in the vehicle's history records.

Result Storage

When a vehicle has been identified from an open work order, the integrated diagnostic system diagnostic unit can send results to the shop management server which will be associated with that work order. Any results that are sent to the shop management server must have associated with them a viewer. This viewer runs in the windows environment, displays and prints those results.

User Interface

The integrated diagnostic system uses a user-friendly interface to provide easy navigation and intuitive operation. An exemplary user interface is described in Appendix 1.

Figure 4:
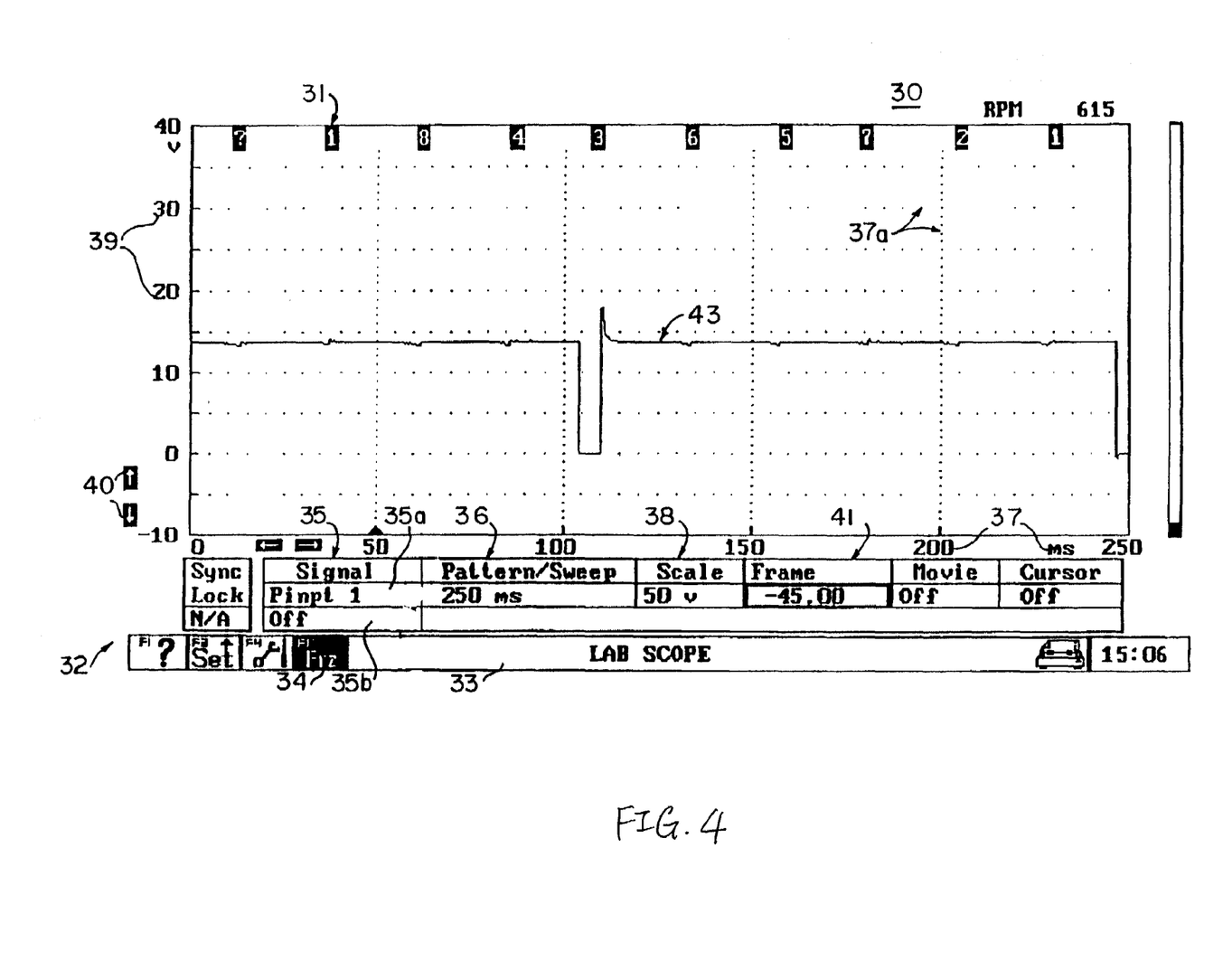
FIG. 4 shows a first exemplary user interface with signals provided by an oscilloscope module.

FIG. 4 shows an exemplary screen display 30 with an illustrative waveform obtained by an oscilloscope module. The screen display 30 is set up in a single-trace display mode, so that it has a single rectangular waveform plot area 31 for displaying a waveform, such as a waveform 43, along a horizontal axis or trace. Displayed below the waveform plot area 31 is a control panel area 32, including a number of icons and indicators in rectangular boxes in which text or other indicia may be displayed.

The lowermost row has a scope mode indicator 33, which indicates the selected operation mode of the integrated diagnostic system. In this case, the indicated mode is oscilloscope.

The control panel area 32 includes control buttons, such as a Signal icon 35, which includes boxes 35a and 35b respectively indicating the signals displayed in the two traces of the dual-trace display scope when it is in dual-scope mode. In each of these boxes, the user can select from a plurality of different signal options, with different options respectively corresponding to different ones of the signal pickup leads 12. In this case, the signal displayed on the first trace is the signal appearing on the "Pinpoint 1" lead. For the box 35b, one of the available options is "OFF". When this option is selected, as in FIG. 4, the second trace is OFF, so that the scope is operating in single-trace mode.

FIG. 4 shows several other control buttons: Pattern/Sweep icon 36, which indicates a 250 ms fixed-time sweep, Time indicia 37, which indicates the sweep time scale, a Scale icon 38, which indicates the scale of the plot area 31 along the vertical axis, and a Frame select icon 41, which is used to select the frame of waveform, data currently displayed on the screen.

Each of the icons in the screen display 30 represents a control button. The icons 35, 36, 38 and 41 may be associated with a list of a plurality of switch options. Each switch assumes one of these options at a given time. The icon box may be considered to be a "window" in which is displayed the indicium corresponding to the currently-selected switch option.

Control keys are provided for users to input direction control. Users use the control keys to move a cursor on the display, or move a user selection to toggle between different display frames or function buttons. Examples of the control keys are up/down/left/right keys, touch pads, joy sticks, touch points, and the like. The following example describes the operation of the user interface when the user uses left/right/up/down arrow keys to toggle between the function buttons to select desired function buttons. A user selection of one of the function buttons may be represented by highlighting the frame of selected button, changing the color of the selected button, or displaying the selected button is a way different from other buttons and the like.

In order to manipulate one of the icon switches represented by the icons 35, 36, 38 and 41 the icon must first be designated as currently active, rendering active the switch or switches represented by the icon. Only one icon is active at a given time. The active icon is indicated by emphasizing it, i.e., by an intensified border drawn around the icon box. For example, in FIG. 4 the box for the Frame select icon 41 is emphasized, indicating that it is active. A non-active icon is activated with the mouse 22 by placing the mouse cursor 42 on the icon and depressing the left mouse button 26. Once the icon is active, clicking the mouse button 26 will incrementally index the list of options in the forward direction, with one step or switch option for each click of the mouse 22. (In the case of the Frame select icon 41, only the integral number part 48 of the frame number can be click indexed in this manner.)

Some of the function buttons may correspond to a plurality of indicia that are assignable to the function keys. Only one indicia is shown at a time. The indicia may correspond to functions or values that are assignable to the function button.

As can be seen in FIG. 4, the waveform 43 is made up of the digitized waveform data in frame −45.00, as is indicated in the Frame select icon 41. There is a plurality of values that can be assigned to icon 41.

The integrated diagnostic system employs a two mode operation to change assigned value or function to the function buttons: a normal mode and a short-cut mode. When using the normal mode operation, the user uses left/right arrow key to move the user selection to icon 41 and captures icon 41. The user then presses a "Y" key to confirm selection of the icon 41. In response, a list of assignable values to icon 41 will be shown. The user can then use the up/down arrow key to change the value assigned to icon 41. Upon the user finds the desired new value, the user will press the "Y" key again to confirm change and selection.

Figure 5:
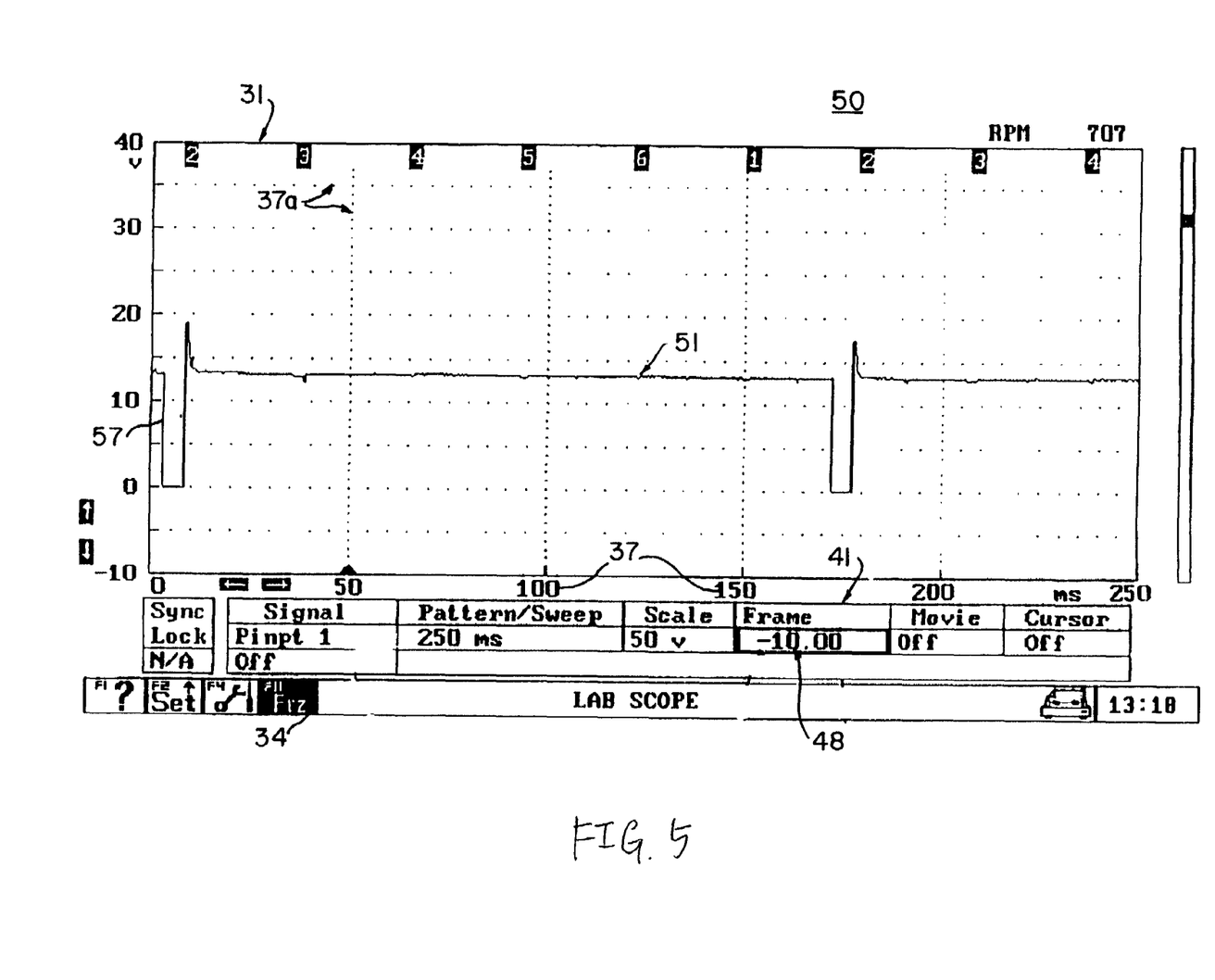
FIG. 5 shows a second exemplary user interface with signals provided by an oscilloscope module.

Alternatively, the user can use the short-cut mode to make selections. Under the shortcut mode, the user uses left/right arrow key to move the user selection to icon 41 and captures icon 41. The user then uses the up/down arrow key to change the value assigned to icon 41. Each up/down stroke may correspond to a value or function assignable to icon 41. As shown in FIG. 5, the user uses the up/down arrow key to change the value of icon 41 from −45 to −10. As soon as the new value is shown on icon 41, the integrated diagnostic system changes the display according to the new assigned value.

Since during the reassignment of the values, the user is not required to push a "Y" key or "Enter" key to bring up a list and another key stroke, such as "Y" again, to confirm selection of the new assigned value, the user saves several key strokes in selecting a new value. In addition, since the effects of the newly assigned value is executed by the system almost immediately, the user can observe if the change fits his needs and determine if another new value is required. The same control applies when assigning new functions to a function button. As soon as the new function name is shown or selected, the system executes the corresponding functions immediately without the need of confirmations from the user.

According to another embodiment, the integrated diagnostic system provides a user interface using a new mechanism for users to navigate through the user interface using direction control keys. The user interface includes a plurality of control buttons arranged in horizontal rows. As described above, a control button may include a list of functions executable by the system or assignable values for a certain function. Some functions in the list may further launch another list to solicit user selections.

The user uses the left/right arrow keys to move a user selection between the control buttons. Upon the user selection is moved to the desired button, with proper time delay, the list corresponding to that control buttons is brought up automatically without any additional key strokes. The user may then use the up/down arrow key to toggle between listed items. Some of the items may contain a sub-list that further lists available selections. If the user moves focus on one of such items, the sub-list will be open up automatically without requiring any further key strokes. Whenever a list is opened up, pressing the left key may be designated as to close the list.

If the control button corresponds to a single function or if an item in focus does not have a sub-list, pressing the right arrow key will enter selection of that function or item.

According to the navigation methodology as described above, since the navigation of the user interface does not use keys other than the direction control keys, navigation is made easy without unnecessary finger movement. In addition, only limited key strokes are used to make user selections. Thus, an user interface with easy and friendly navigation experience is achieved.

Although the above exemplary embodiments are discussed by using horizontally arranged control buttons and left/right arrow keys to move between control buttons and up/down key to navigation or indicate selections, the same methodology may apply to vertically arranged control buttons with the exception that the user uses the up/down arrow key to toggle between function buttons.

Figure 6A:
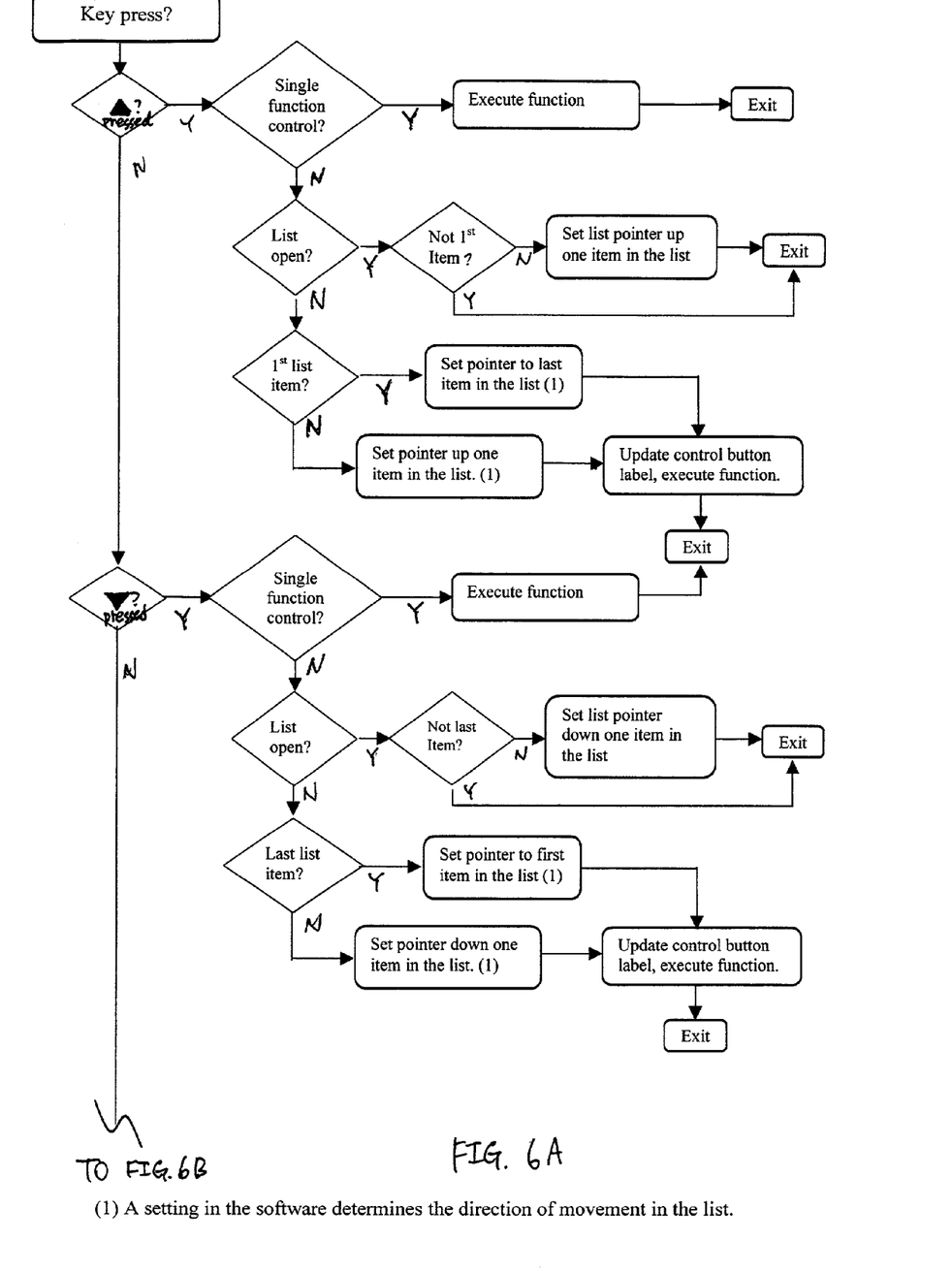
FIGS. 6A-6C show a flow chart of an exemplary navigation methodology.
Figure 6B:
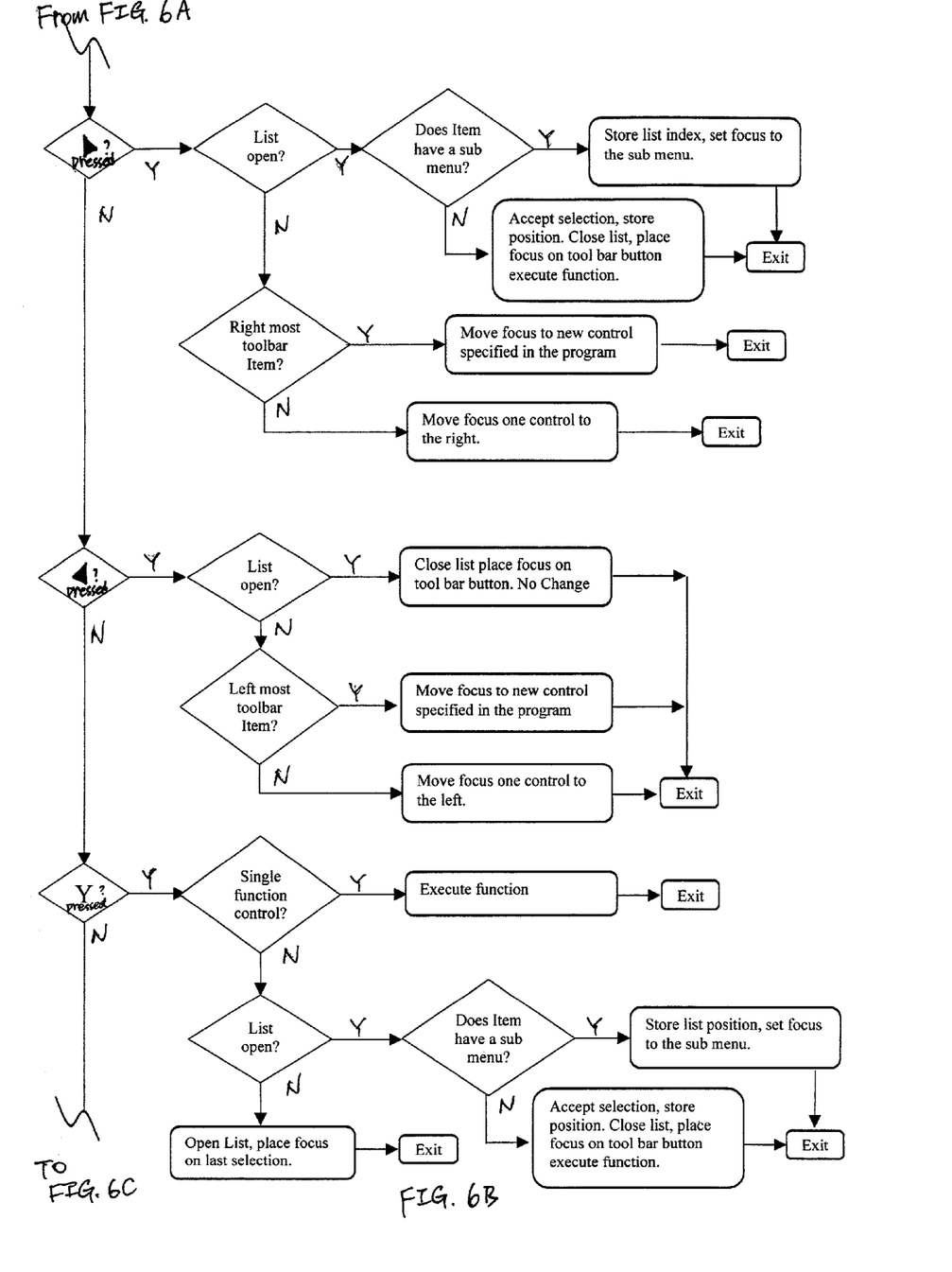
Figure 6C:
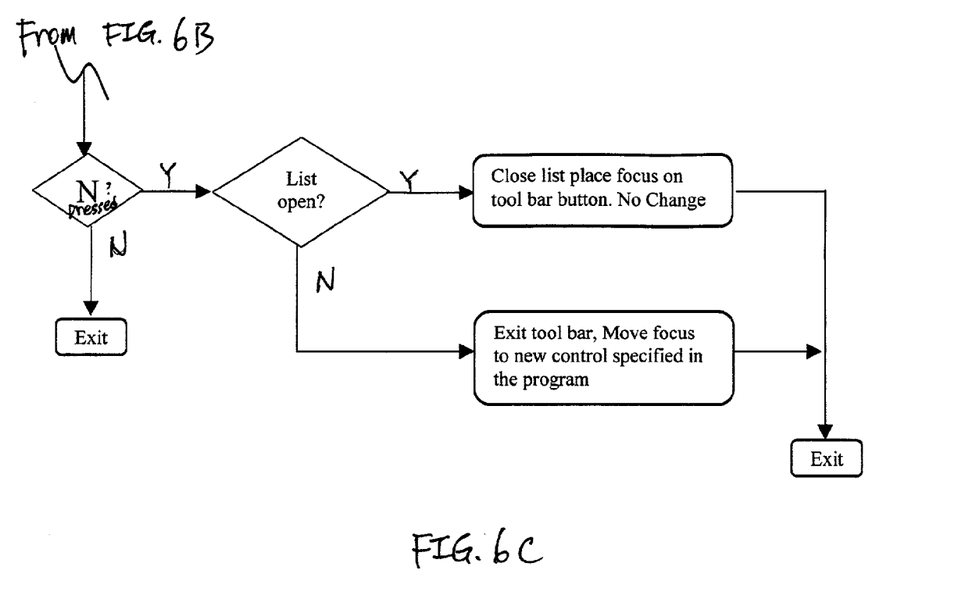

A flow chart illustrating the navigation methodology is shown in FIGS. 6A-6C.

Embodiments discussed above also apply to distributing numerous types of data, for example, service data for different types of systems, such as automobile, motorcycles, airplanes, powerboats, machines, equipment, etc. Other types of data may include testing process, expert database, software applications, drivers, update files, etc. Those skilled in the art will recognize, or be able to ascertain using no more than routine experimentation, many equivalents to the specific embodiments specifically described herein. Such equivalents are intended to be encompassed in the scope of the following claims.

What is claimed is:

1. A data processing system, comprising:
a processor for processing data;
a display;
a first control key for moving a user selection in a first direction on a display;
a second control key for moving the user selection in a second direction on the display;
a data storage device bearing instructions to cause the system upon execution of the instructions by the processor to perform the steps of:
displaying a plurality of buttons on the display, wherein one of the buttons is associated with a plurality of options;
receiving a first signal representing depression of the first control key moving the user selection to the button associated with the plurality of options;
subsequent to receiving the first signal, receiving a second signal representing depression of the second control key when the user selection being moved to the button associated with the plurality of options; and
responsive to the second signal representing depression of the second control key moving the user selection from a first one of the options to a second one of the options to select the second one of the options, automatically executing the selected one of the plurality of options without the need for any further user actions.

2. The system of claim 1, wherein responsive to each depression of the second control key, one of the plurality of options is selected.

3. The system of claim 2, wherein the selected option is associated with a function.

4. The system of claim 3, wherein the function associated with the selected option is activated in response to the depression of the second control key.

5. The system of claim 2, wherein the selected option is associated with a setting.

6. The system of claim 1, wherein the steps are sequentially performed.

7. The system of claim 4, wherein the option, once activated, display a list of additional options associated with the activated option.

8. In a data processing system including a first control key for moving a user selection in a first direction on a display, and a second control key for moving the user selection in a second direction on the display, a method for controlling the data processing system including the steps of:
displaying a plurality of buttons on the display, wherein one of the buttons is associated with a plurality of options;
receiving a first signal representing depression of the first control key moving the user selection to the button associated with the plurality of options;
subsequent to receiving the first signal, receiving a second signal representing depression of the second control key when the user selection being moved to the button associated with the plurality of options; and
responsive to the second signal representing depression of the second control key moving the user selection from a first one of the options to a second one of the options to select the second one of the options, automatically executing the selected one of the plurality of options without the need for any further user actions.

9. The method of claim 8, wherein responsive to each depression of the second control key, one of the plurality of options is selected.

10. The method of claim 9, wherein the selected option is associated with a function.

11. The method of claim 10, wherein the function associated with the selected option is activated in response to the depression of the second control key.

12. The method of claim 9, wherein the selected option is associated with a setting.

13. The method of claim 8, wherein the steps are sequentially performed.

14. A data storage device bearing instructions to cause a data processing system, upon execution of the instructions, to perform the steps of:
receiving signals generated by a first control key of the data processing system for moving a user selection in a first direction on a display;
receiving signals generated by a second control key for moving the user selection in a second direction on the display;
displaying a plurality of buttons on the display, wherein one of the buttons is associated with a plurality of options;
receiving a first signal representing depression of the first control key moving the user selection to the button associated with the plurality of options;
subsequently to receiving the first signal, receiving a second signal representing depression of the second control key when the user selection being moved to the button associated with the plurality of options; and
responsive to the second signal representing depression of the second control key moving the user selection from a first one of the options to a second one of the options to select the second one of the options, automatically executing the selected one of the plurality of options without the need for any further user actions.

* * * * *

UNITED STATES PATENT AND TRADEMARK OFFICE
CERTIFICATE OF CORRECTION

| | | |
|---|---|---|
| PATENT NO. | : 7,350,159 B2 | Page 1 of 1 |
| APPLICATION NO. | : 10/134690 | |
| DATED | : March 25, 2008 | |
| INVENTOR(S) | : Jim J. Cancilla et al. | |

It is certified that error appears in the above-identified patent and that said Letters Patent is hereby corrected as shown below:

On the Title page Item "(60) Related U.S. Application Data" change "Provisional Application No. 60/354,204, filed Feb. 6, 2002..." to --Provisional Application No. 60/354,204, filed May 18, 2001...--.

Signed and Sealed this

Thirtieth Day of September, 2008

JON W. DUDAS
*Director of the United States Patent and Trademark Office*